(12) United States Patent
Shi

(10) Patent No.: US 11,981,158 B2
(45) Date of Patent: May 14, 2024

(54) GRATING PAINTING DEVICE BASED ON FIXED VIEWING ANGLE

(71) Applicant: Shanghai Bigimage Co., Ltd, Shanghai (CN)

(72) Inventor: Gang Shi, Shanghai (CN)

( * ) Notice: Subject to any disclaimer, the term of this patent is extended or adjusted under 35 U.S.C. 154(b) by 142 days.

(21) Appl. No.: 17/857,702

(22) Filed: Jul. 5, 2022

(65) Prior Publication Data

US 2023/0024147 A1 Jan. 26, 2023

(51) Int. Cl.
*B44C 5/02* (2006.01)
*B44F 7/00* (2006.01)

(52) U.S. Cl.
CPC . *B44C 5/02* (2013.01); *B44F 7/00* (2013.01)

(58) Field of Classification Search
CPC . G09F 19/14; G09F 11/00; B44C 5/02; B44F 7/00
See application file for complete search history.

(56) References Cited

U.S. PATENT DOCUMENTS

| | | | | |
|---|---|---|---|---|
| 3,883,966 A * | 5/1975 | Ludwig | ................... | G09F 11/00 40/437 |
| 5,440,214 A * | 8/1995 | Peeters | ................... | G09F 11/00 40/446 |
| 5,657,565 A * | 8/1997 | Dehli | ..................... | G09F 11/00 40/437 |
| 5,783,919 A * | 7/1998 | Dehli | ..................... | G09F 11/10 318/470 |
| 6,219,948 B1 * | 4/2001 | Bar-Yona | ................. | G09F 9/30 40/454 |
| 6,286,239 B1 * | 9/2001 | Greenlees | ............... | G09F 11/00 40/437 |
| 6,748,684 B1 * | 6/2004 | Bar-Yona | ................ | G09F 11/00 40/454 |
| 2003/0014890 A1 * | 1/2003 | Bar-Yona | ................ | G09F 11/00 40/454 |
| 2004/0027311 A1 * | 2/2004 | Hunt | ...................... | G09F 19/14 345/4 |
| 2004/0231206 A1 * | 11/2004 | Liebman | ................. | G09F 19/14 40/453 |
| 2005/0235534 A1 * | 10/2005 | Luinstra | .................. | G09F 11/00 40/454 |
| 2005/0284010 A1 * | 12/2005 | Bar-Yona | ................ | G09F 11/00 40/454 |

(Continued)

*Primary Examiner* — Gary C Hoge

(57) ABSTRACT

A grating painting device based on fixed viewing angle is disclosed, which includes a painting board, a grating board, a support frame and a reciprocating moving mechanism, the grating board is arranged above the painting board, the support frame is fixed at the bottom of the painting board, the support frame is arranged perpendicular to the painting board, and the reciprocating movement mechanism is arranged on the support frame. The reciprocating mechanism is used to drive the support frame to move, and then the painting board is driven to move left and right, and the moving distance is guaranteed to be a multiple of more than 1/N (N is the number of lines of the grating board) inches. Under the condition that the observation position is unchanged, multiple pictures can be seen to appear continuously, and a animation or video can be visually experienced to be repeatedly displayed on the pictures.

5 Claims, 5 Drawing Sheets

(56) References Cited

U.S. PATENT DOCUMENTS

| | | | | |
|---|---|---|---|---|
| 2006/0070273 A1* | 4/2006 | Chan | ................ | G09F 11/20 |
| | | | | 40/430 |
| 2007/0163159 A1* | 7/2007 | Fernandez Conesa | ................ | |
| | | | | G09F 11/00 |
| | | | | 40/446 |
| 2007/0193086 A1* | 8/2007 | Chuang | ................ | G09F 9/375 |
| | | | | 40/453 |
| 2007/0234607 A1* | 10/2007 | Chuang | ................ | G09F 19/14 |
| | | | | 40/453 |
| 2011/0096071 A1* | 4/2011 | Okamoto | ................ | H04N 13/305 |
| | | | | 345/419 |
| 2011/0122236 A1* | 5/2011 | Yamada | ................ | H04N 13/305 |
| | | | | 348/55 |
| 2011/0157338 A1* | 6/2011 | Chang | ................ | H04N 13/305 |
| | | | | 348/59 |
| 2015/0092268 A1* | 4/2015 | Hasegawa | ................ | G02B 30/27 |
| | | | | 359/463 |

* cited by examiner

GRATING PAINTING DEVICE BASED ON FIXED VIEWING ANGLE

This patent application claims the benefit and priority of Chinese Patent Application No. 202110824528.0 filed on Jul. 21, 2021, the disclosure of which is incorporated by reference herein in its entirety as part of the present application.

TECHNICAL FIELD

The present disclosure relates to the field of grating painting, in particular to a grating painting device based on a fixed viewing angle.

BACKGROUND ART

Grating painting, also known as stereoscopic painting, panoramic painting, is a direct stereoscopic effect can be seen in a special picture. In the existing grating change painting, the composite picture is directly printed or printed on the grating material, or printed on the photographic paper or PP paper by a photo machine, and then mounted on the grating plate by high-penetration double-sided adhesive. If you want to see a different picture content, or to see a continuous animation effect, you must let the observer change the viewing position or change the angle of view, or move the grating around (or up and down) to see the effect.

SUMMARY

The purpose of the present disclosure is to provide a grating painting device based on a fixed viewing angle. Under the condition that the observation position is unchanged, multiple pictures can be continuously displayed, and a section of animation or video can be repeatedly displayed on the pictures visually, so as to solve the problems mentioned in the above background technology.

To achieve the above purpose, the present disclosure provides the following technical scheme:
a grating painting device based on a fixed viewing angle includes:
  a painting board;
  a support frame, the support frame is fixed to the bottom of the painting board, and the support frame is arranged perpendicular to the painting board;
  a reciprocating mechanism, the reciprocating mechanism is provided on the support frame.

Preferably, the reciprocating mechanism includes an eccentric wheel and a first motor, the eccentric wheel is located in a circular groove on the support frame, and the eccentric wheel is fixed on the output shaft of the first motor.

Preferably, the reciprocating mechanism includes a screw rod and a second motor, the screw rod is in threaded connection with the support frame, and one end of the screw rod is fixedly connected with the output shaft of the second motor.

Preferably, the reciprocating mechanism includes an electric device, and an output shaft of the electric device is fixed to the support frame.

Preferably, the reciprocating mechanism includes a pneumatic device, and the output shaft of the pneumatic device is fixed on the support frame.

Preferably, the reciprocating mechanism includes a hydraulic device, and the output shaft of the hydraulic device is fixed on the support frame.

Compared with the prior art, the advantageous effects of the present disclosure are:
  in the case of a reciprocating movement mechanism, the support frame is driven to move, and then the painting board is driven to move left and right, and the movement distance is ensure to be greater than 1/N (N is the number of lines of the grating plate) inches. Under the condition that the observation position is unchanged, multiple pictures can be seen to appear continuously, and a section of animation or video can be visually displayed repeatedly on the picture.

In the picture: 1. painting board; 2. supporting frame; 3. reciprocating movement mechanism; 311. eccentric wheel; 312. first motor; 321. screw rod; 322. second motor; 331. electric device; 341. pneumatic device; 351. hydraulic device; 4. grating plate.

DETAILED DESCRIPTION OF THE EMBODIMENTS

In the following, technical solutions in the embodiment of the present disclosure will be clearly and completely described with reference to the accompanying paintings in the embodiment of the present disclosure. It is obvious that the described embodiments are only a part of the embodiments of the present disclosure, but not all of the embodiments.

Embodiment 1

Figure 1:
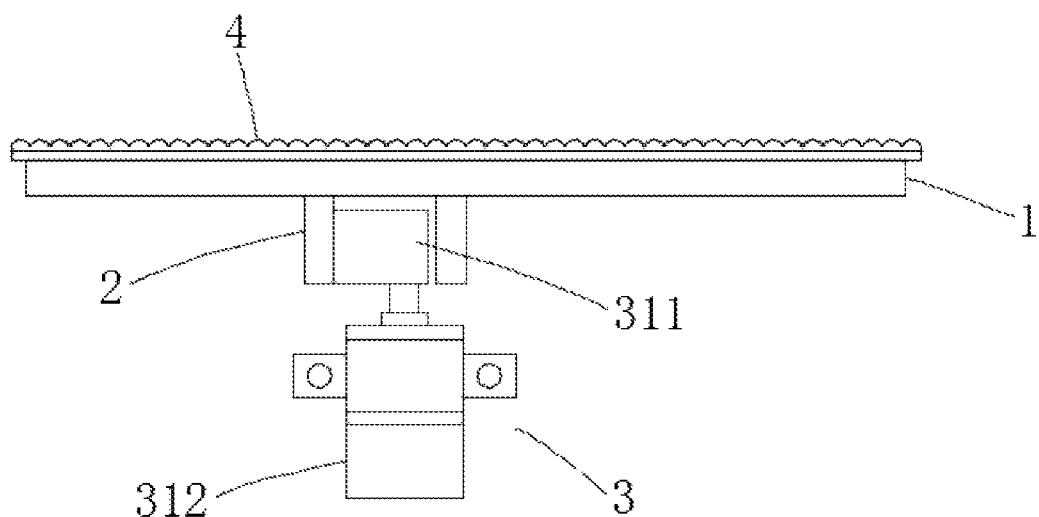
FIG. 1 is a schematic structural diagram of an embodiment of the present disclosure.

Referring to FIG. 1, the present disclosure provides a grating painting device based on a fixed viewing angle, including a painting board 1, a grating board 4, a support frame 2 and a reciprocating mechanism 3, the grating board 4 is arranged above the painting board 1, the support frame 2 is fixed to the bottom of the painting board 1, the supporting frame 2 is located perpendicular to the painting board 1, and the reciprocating mechanism 3 is fixed on the supporting frame 2.

The reciprocating mechanism 3 includes an eccentric wheel 311 and an first motor 312, the eccentric wheel 311 is located in the circular groove on the support frame 2, and the eccentric wheel 311 is fixed on the output shaft of the first motor 312.

Working principle and use flow: the disclosure adopts the manufacturing process of separating the drawing board 1 from the grating board 4, and drives the eccentric wheel 311 to rotate by the first motor 312, so that the edge of the eccentric wheel 311 pushes the support frame 2 in turn, and then pushes the drawing board 1 to move back and forth, with the moving distance being guaranteed to be a multiple of 1/N (N is the number of lines of the grating board 4) inches, and Under the condition that the observation position is unchanged, multiple pictures can be seen to appear continuously, and a animation or video can be visually experienced to be repeatedly displayed on the pictures.

Embodiment 2

Figure 2:
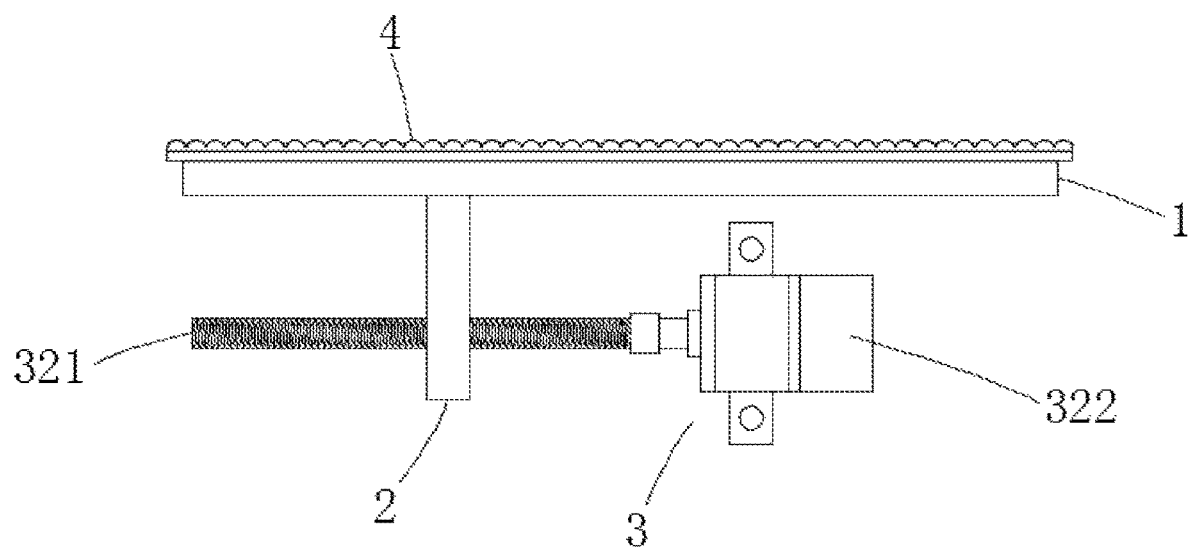
FIG. 2 is a schematic structural diagram of an embodiment of the present disclosure.

Referring to FIG. 2, the difference from embodiment 1 is that:

the reciprocating mechanism 3 includes a screw rod 321 and a second motor 322, the screw rod 321 is in threaded connection with the support frame 2, and one end of the screw rod 321 is fixedly connected with the output shaft of the second motor 322.

Working principle and use flow: The disclosure adopts the manufacturing process of separating the drawing board 1 from the grating board 4, and controls the second motor 322 to rotate forward and backward to drive the screw rod 321 to rotate forward and backward, so that the support frame 2 moves back and forth, and then drives the drawing board 1 to move back and forth, and the moving distance is guaranteed to be a multiple of 1/N (N is the number of lines of the grating board) inches. Under the condition that the observation position is unchanged, multiple pictures can be seen to appear continuously, and a animation or video can be visually experienced to be repeatedly displayed on the pictures.

Figure 3:
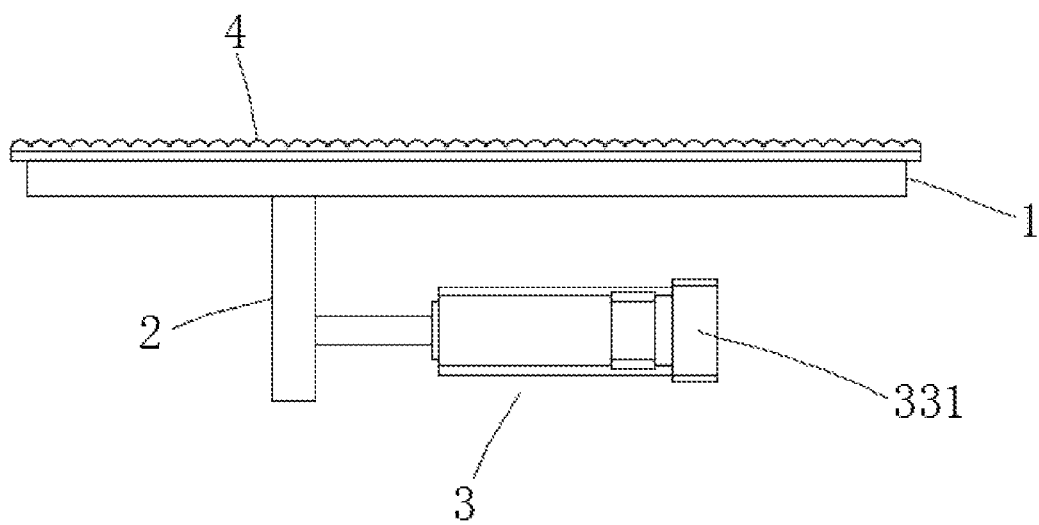
FIG. 3 is a schematic structural diagram of an embodiment of the present disclosure.

Referring to FIG. 3, the difference from embodiment 1 is that:

the reciprocating mechanism 3 includes an electric device 331, and the output shaft of the electric device 331 is fixed on the support frame 2.

Working principle and use flow: the disclosure adopts the manufacturing process of separating the drawing board 1 from the grating board 4, and controls the output shaft of the electric device 331 to reciprocate. In this embodiment, the electric device 331 adopts a servo electric cylinder to make the supporting frame 2 reciprocate, and then drives the drawing board 1 to reciprocate. The moving distance is guaranteed to be greater than a multiple of 1/N (N is the number of grating board lines) inches. Under the condition that the observation position is unchanged, multiple pictures can be seen to appear continuously, and a animation or video can be visually experienced to be repeatedly displayed on the pictures.

Embodiment 4

Figure 4:
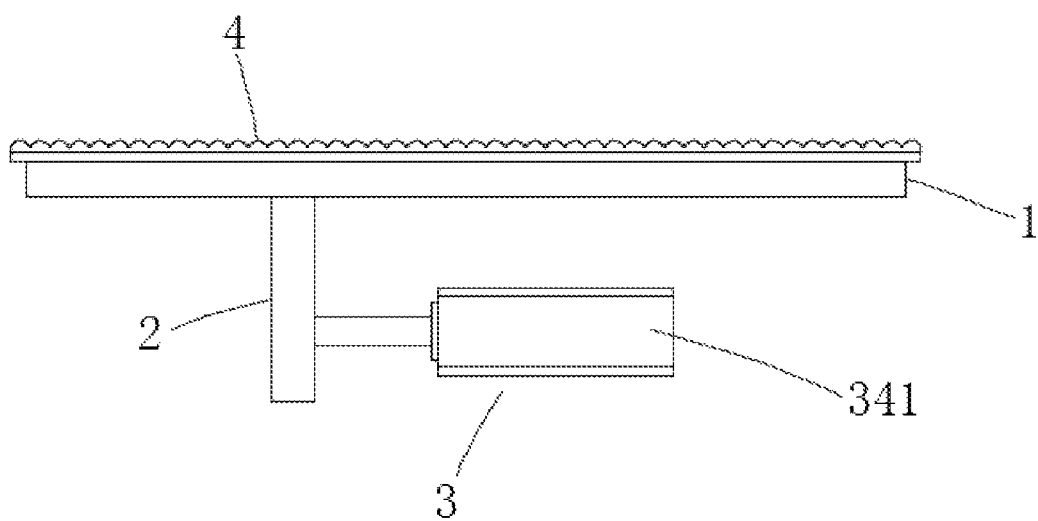
FIG. 4 is a schematic structural diagram of an embodiment of the present disclosure.

Referring to FIG. 4, the difference from embodiment 1 is that:

the reciprocating mechanism 3 includes a pneumatic device 341, and the output shaft of the pneumatic device 341 is fixed on the support frame 2.

The disclosure adopts the manufacturing process of separating the drawing board 1 from the grating board 4, and controls the output shaft of the pneumatic device 341 to reciprocate. In this embodiment, the pneumatic device 341 adopts an air cylinder to make the support frame 2 reciprocate, thus driving the drawing board 1 to reciprocate. The moving distance is guaranteed to be greater than a multiple of 1/N (N is the number of lines of grating board) inches. Under the condition that the observation position is unchanged, multiple pictures can be seen to appear continuously, and a animation or video can be visually experienced to be repeatedly displayed on the pictures.

Embodiment 5

Figure 5:
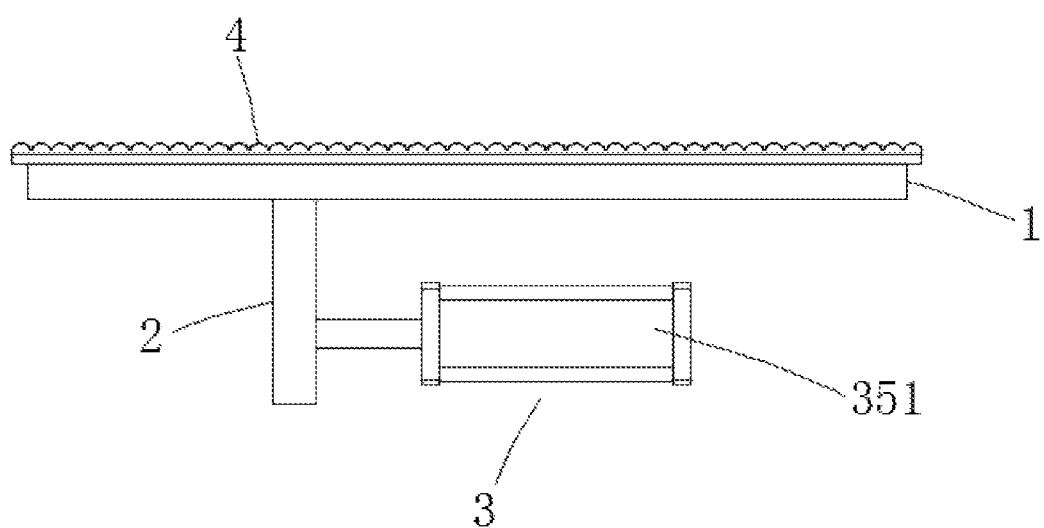
FIG. 5 is a schematic structural diagram of an embodiment of the present disclosure.

Referring to FIG. 5, the difference from embodiment 1 is that:

the reciprocating mechanism 3 includes a hydraulic device 351, and the output shaft of the hydraulic device 351 is fixed on the support frame 2.

Working principle and use flow: the disclosure adopts the manufacturing process of separating the drawing board 1 from the grating board 4, and controls the output shaft of the hydraulic device 351 to reciprocate. In this embodiment, the hydraulic device 351 adopts a hydraulic cylinder to make the supporting frame 2 reciprocate, thus driving the drawing board 1 to reciprocate. The moving distance is guaranteed to be greater than a multiple of 1/N (N is the number of grating board lines) inches. Under the condition that the observation position is unchanged, multiple pictures can be seen to appear continuously, and a animation or video can be visually experienced to be repeatedly displayed on the pictures.

To sum up, the reciprocating mechanism 3 includes but is not limited to the structure mentioned in the above embodiment, and all the structures that can drive the drawing board 1 to reciprocate are the protection scope of the present disclosure.

When in use, the disclosure adopts a manufacturing process of separating the picture board 1 and the grating board 4, and drives the supporting frame 2 to move by the reciprocating mechanism 3 so as to drive the picture board 1 to move left and right. The moving distance is guaranteed to be greater than a multiple of 1/N (N is the number of lines of the grating panel) inches, such as 18-line grating panel 4, and the moving amount of drawing panel 1 is only greater than a multiple of 0.056 inches, such as 0.056 inches. At this time, under the condition that the observation position is not changed, multiple pictures can be seen to be continuously displayed, and if three pictures are combined and printed, the three pictures can be seen to be continuously displayed when the drawing board 1 reciprocates. If twelve frame of animation are synthesized and printed, when the drawing board 1 moves back and forth, twelve frames of images can be seen continuously, and a video or an animation can be visually displayed repeatedly on the image.

Although the embodiments of the present disclosure have been shown and described, it will be understood by those skilled in the art that many changes, modifications, substitutions and variations can be made to these embodiments without departing from the principle and spirit of the present disclosure, and the scope of the present disclosure is defined by the appended claims and their equivalents.

What is claimed is:

1. A grating painting device based on a fixed viewing angle:
comprising:
a painting board;
a grating plate, the grating plate is arranged above the painting board;
a support frame, the support frame is fixed to the bottom of the painting board, and the support frame is arranged perpendicular to the painting board;
a reciprocating mechanism, the reciprocating mechanism is provided on the support frame;
wherein the reciprocating mechanism comprises an eccentric wheel and a first motor; the eccentric wheel is located in a circular groove on the support frame; and the eccentric wheel is fixed on the first motor.

2. The device of claim 1, wherein the reciprocating mechanism comprises a screw rod and a second motor, the screw rod is in threaded connection with the support frame, and one end of the screw rod is fixedly connected with the output shall of the second motor.

3. The device of claim 1, wherein the reciprocating mechanism comprises an electric device, and an output shaft of the electric device is fixed to the support frame.

4. The device of claim 1, wherein the reciprocating mechanism comprises a pneumatic device, and the output shaft of the pneumatic device is fixed on the support frame.

5. The device of claim 1, wherein the reciprocating mechanism comprises a hydraulic device, and the output shall of the hydraulic device is fixed on the support frame.

\* \* \* \* \*